United States Patent Office 3,032,980
Patented May 8, 1962

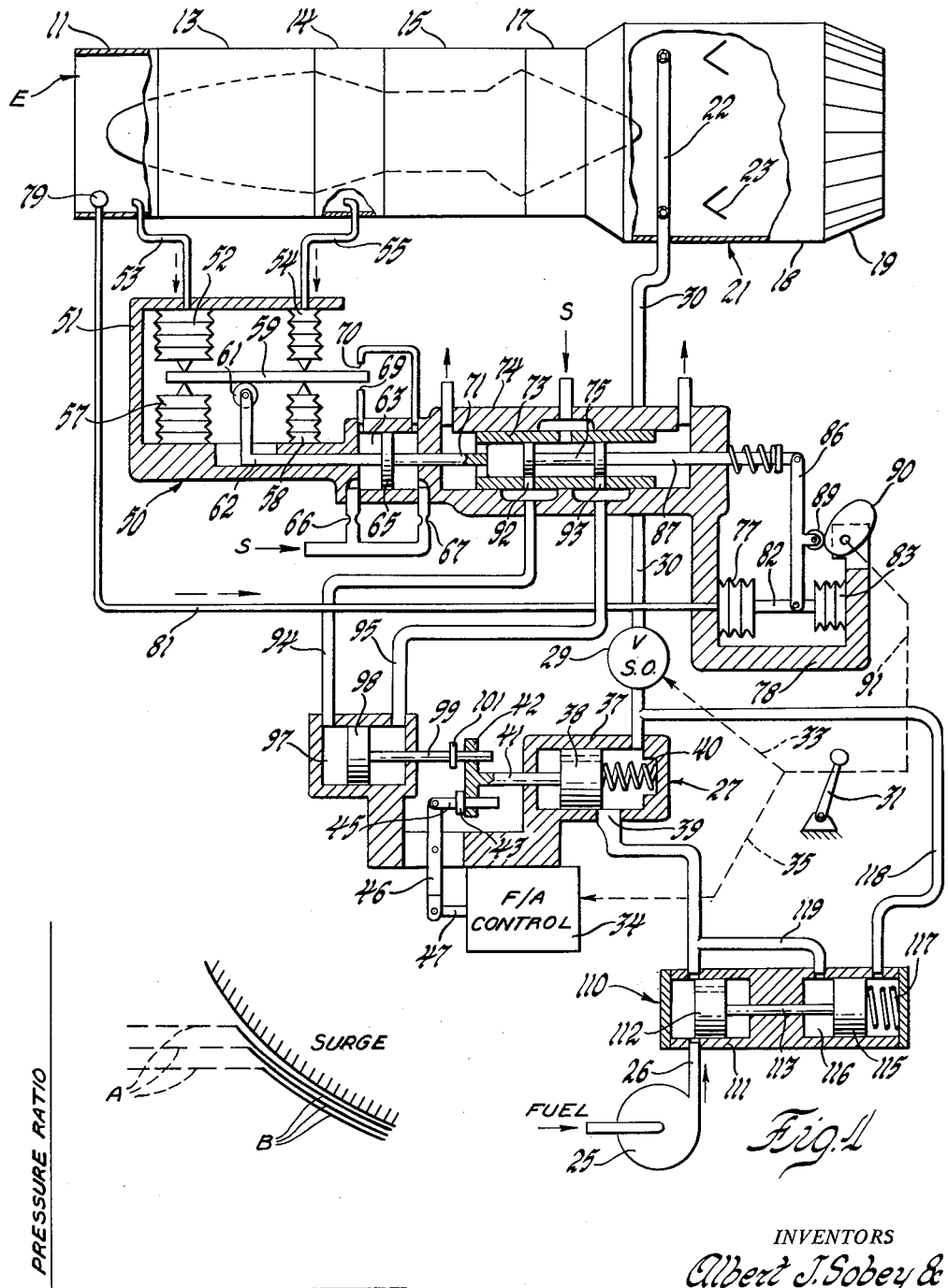

3,032,980
AFTERBURNER FUEL CONTROL
Albert J. Sobey and Robert M. Swick, Indianapolis, Ind., assignors to General Motors Corporation, Detroit, Mich., a corporation of Delaware
Filed Nov. 12, 1959, Ser. No. 852,310
5 Claims. (Cl. 60—35.6)

Our invention is directed to improvements in fuel controls for afterburners such as are used with turbojet engines. In general, prior afterburner fuel controls operate to maintain a substantially constant ratio of fuel to air available for combustion in the afterburner. This ratio is variable within allowable limits by a control operated by the pilot of the aircraft.

Our invention provides an addition to or improvement upon such known controls. It involves a closed-loop control of afterburner fuel flow in response to the pressure ratio of the compressor of the engine. The compressor inlet and discharge total pressures are sensed, and the pressure ratio is determined. A scheduling signal requests a compressor pressure ratio. The requested and the actual pressure ratios are compared to establish the pressure ratio error that may exist. The pressure ratio error is transmitted to means for controlling afterburner fuel which acts to correct fuel flow, with the ultimate result of nulling the error in pressure ratio.

The pressure ratio error signal may be employed to control the speed or displacement of an afterburner pump, to throttle or otherwise meter fuel flowing from the pump to the afterburner, to bypass fuel back to the inlet of the pump, or in any other way suited to a particular fuel pumping and control system.

Scheduling signals that may be employed include power lever position, ram air temperature, rotor speed, and corrected rotor speed. The particular input signal or combination of input signals may depend upon the particular engine and its use. The preferred embodiment of the invention, described herein, uses a pressure ratio request or scheduling signal based upon power lever position and ram air (engine inlet air) temperature. This scheduling signal establishes a limiting value of compressor pressure ratio. If the ratio increases above the scheduled value, the flow of fuel to the afterburner is reduced, with the result that the compressor pressure ratio is reduced.

We are aware that controls have been proposed which employ compressor discharge pressure or pressure rise in means for controlling afterburner fuel. However, our invention is to be distinguished from such prior art proposals, since in such devices the compressor discharge pressure or pressure rise is employed to meter afterburner fuel in proportion to air flow. In short, such controls increase afterburner fuel in response to increase in compressor outlet pressure or some related condition. Our invention may be used with such controls, but the operation of our invention is such as to decrease the afterburner fuel flow as compressor pressure ratio increases above a scheduled value.

The principal objects of our invention are to improve the operation of afterburning jet engines, to promote safe and efficient operation of such engines, and to provide means operative to control afterburner fuel as a function of compressor pressure ratio and thereby control or limit the pressure ratio.

The nature of the invention and advantages thereof will be apparent to those skilled in the art from the succeeding detailed description of the preferred embodiment of the invention and the accompanying drawings thereof.

FIGURE 1 is a schematic diagram of an afterburner fuel control embodying the invention.

FIGURE 2 is a chart illustrating the operation of the control.

The control system of the invention is illustrated in FIGURE 1 as associated with a turbojet engine E of standard type comprising an air inlet section 11, a compressor 13, a compressor outlet section 14, combustion apparatus 15, a turbine 17, an exhaust duct 18, and a variable area jet nozzle 19. A convergent nozzle is illustrated, but the nozzle may be of any type suited to the particular application. The turbine 17 drives the compressor 13, which supplies air to the combustion apparatus 15 in which fuel is burned to provide motive fluid for the turbine 17. The turbine exhaust gases issue from nozzle 19 as a propulsive jet. An afterburner of any usual type is mounted in the exhaust duct 18 to burn additional fuel in the engine exhaust and thereby increase the thrust of the engine. The afterburner 21 includes a fuel manifold or fuel spray ring 22 and a flameholder such as the usual V gutters 23.

The means for supplying and controlling fuel burned in the combustion apparatus 15 is immaterial and is not illustrated. The means for supplying fuel to the afterburner, as illustrated, comprises a centrifugal pump 25 which may be supplied from any suitable source and may be driven by an air turbine or other suitable means. Pump 25 delivers fuel through a discharge line 26, a throttling type metering valve 27, a shutoff valve 29, and a conduit 30 to the afterburner fuel manifold 22. The operation of the afterburner is controlled by a pilot's power control lever 31, which ordinarily controls also the operation of the engine. Lever 31 is connected by any suitable transmission, indicated by the broken line 33, to the shutoff valve 29 so as to open the valve when afterburning operation is called for. Lever 31 also is connected to an afterburner fuel control, which may be of standard type, and is indicated by the fuel-air ratio control 34. A control connection, indicated by the broken line 35, enables the pilot to set the level of afterburner thrust augmentation. Typically, this is in terms of afterburner fuel to air ratio.

The fuel control 34 acts by varying the setting of the metering valve 27. Means for this purpose are illustrated schematically. Valve 27 comprises a cylinder 37 and a plunger 38 reciprocable in the cylinder. Plunger 38 variably throttles an inlet port 39 supplied by pump 25 through line 26. Valve plunger 38 may be biased to its open position by fuel pressure and by a compression spring 40. The axial position of valve plunger 38 is controlled by a stem 41 which terminates in a head 42. Head 42 is engaged by a shoulder or collar 43 on a push rod 45 slidably guided in the head 42. Pushrod 45 is coupled by a rocker arm 46 pivoted on structure integral with the valve cylinder 37 and coupled to a control rod 47 operated by the fuel control 34, which is mounted on the fixed structure. The afterburner control 34 acts in response to the signal from the pilot's lever 31 and to such other parameters as may be suitable to move valve member 38 to vary the area of port 39 and thereby the amount of fuel delivered by pump 25.

The engine and afterburner fuel system as described so far are conventional, and are merely illustrative of a suitable environment for the invention. As previously stated, the control device of the invention includes means responsive to compressor pressure ratio and to power lever setting which act to limit pressure ratio to a value scheduled by inlet temperature and power lever position. This limiting is effected by reducing the flow of fuel to the afterburner.

Pressure ratio may be measured by any suitable mechanism such as that indicated by the numeral 50. This structure comprises a fixed upport or base 51 on which is mounted an expansible bellows 52 connected through line 53 to a total pressure probe in the engine air inlet. A second bellows 54 is connected through a line 55 to a total pressure probe in the compressor outlet. Bellows 52 and 54 act in opposition to bellows 57 and 58, which are respectively of equal area thereto, and are evacuated so as to compensate for variations of ambient pressure at the control device 50. The bellows act in opposition upon a balance arm having a variable fulcrum defined by a roller 61 mounted on a member 62 reciprocably guided in the base 51. The position of fulcrum 61 determines the pressure ratio at which arm 59 is balanced. Rotation of balance arm 59 in response to unbalance thereof actuates a servomechanism which moves the fulcrum 61 to restore the arm to balance. The position of the fulcrum thus provides a measure of the compressor pressure ratio.

The servomechanism illustrated comprises a cylinder 63 within which is mounted a piston 65. Servo fluid under pressure is supplied from any suitable source, indicated by the letter S, through matched orifices 66 and 67 to the opposite ends of cylinder 63. Nozzles 69 and 70 through which fluid is exhausted from the two ends of the cylinder are disposed on opposite sides of balance arm 59 so as to be inversely throttled by upward or downward movement of the balance arms. Thus, if the balance arm moves off center, pressure in one end of cylinder 63 increases above that in the other end, operating piston 65 and the slidable member 62 fixed thereto. The fulcrum 61 is thus continuously moved to rebalance the arm 59, and its position indicates the compressor pressure ratio. The balance arm 59 may be mounted in any suitable manner to permit it to tilt, but is restrained against other movement.

Piston 65 is also connected by a stem 71 to a slidable valve sleeve 73 which provides an output of pressure ratio to additional elements of the control. Sleeve 73 is slidable in a ported cylinder 74 to which servo fluid is supplied from the source S. A valve spool 75 slidably mounted in the sleeve 73 is actuated by mechanism which provides a schedule of pressure rise. This mechanism comprises a temperature bellows 77 mounted on a bracket 78 integral with the body 51. This bellows is connected to an inlet air temperature probe 79 by a pressure connection 81. The bellows responds to the pressure of volatile material in bellows 79, which is determined by the inlet temperature. Bellows 77 actuates a rod 82 in opposition to an evacuated ambient pressure compensating bellows 83 also mounted on the bracket 78. Rod 82 is pivoted to a floating lever 86 which is pivoted to the stem 87 of valve spool 75. Lever 86 mounts a roller 89 which provides a fulcrum for the lever. Roller 89 is a cam follower in engagement with a cam 90 rotatably mounted on the bracket 78 and coupled through suitable means, indicated by 91, to the power control lever 31 so that the position of the fulcrum is determined by power control lever position. The axial position of valve spool 75 is determined, therefore, by inlet air temperature and by the movement of cam 90 establishing a schedule of ram air temperature. To put this differently, the position of valve spool 75 represents the scheduled pressure rise based upon the power lever position and inlet temperature. The position of sleeve 73 represents the actual pressure rise. As sleeve 73 and spool 75 are illustrated, the values of scheduled and actual pressure rise are equal, and spool 75 blocks ports 92 and 93 in sleeve 73. Ports 92 and 93 are connected through lines 94 and 95 with the ends of a servo cylinder 97 in which is mounted a piston 98. The stem 99 of piston 98 is slidably engaged in the head 42 of the fuel metering valve control stem 41. This is a lost motion connection coupled by engagement of an abutment or collar 101 on stem 99 with head 42.

If actual pressure rise is less than that scheduled, sleeve 73 will move to the left as shown in the drawing with respect to spool 75, supplying servo fluid through port 93 and line 95 to move piston 98 to the left, in a fuel increasing direction. This movement has no effect since the afterburner fuel is controlled by the fuel-air control 34 under these conditions. However, if the pressure rise exceeds that scheduled, the relative position of sleeve 73 with respect to spool 75 will be to the right of that shown, and servo fluid will be supplied through port 92 and line 94 to actuate piston 98 until collar 101 engages head 42 and the metering valve member 38 is moved in a closing direction. Closing the metering valve progressivley reduces afterburner fuel and thereby reduces the back pressure on the turbine and consequently the compressor pressure ratio. The afterburner fuel flow will, therefore, stabilize at a value, determined by the pressure ratio control, which maintains pressure ratio at the scheduled value. If at any time the fuel flow scheduled by control 34 becomes less than the limit imposed by the pressure ratio control, the control device 34 will take over control of the metering valve 27. The pressure ratio control assures, however, that pressure ratio is maintained at a suitable value determined in accordance with the characteristics of the engine by throttle position and inlet temperature.

It is desirable to maintain a constant pressure drop across metering valve 27 so that fuel flow is a definite function of the opening of the valve. Various means may be used to assure this. As illustrated, the drop across metering valve 27 is maintained constant by a throttling valve assembly 110. This valve assembly comprises a body 111 in which a reciprocable valve member 112 controls ports throttling the fuel supply line between pump 25 and metering valve 27. Valve member 112 is connected by a stem 113 to a piston 115 reciprocable in a cylinder 116 in body 111. Piston 115 is biased in the direction to close the throttling valve by a compression spring 117 and by pressure downstream of the metering valve communicated through a line 118. It is biased in the opposite direction by pressure ahead of the metering valve supplied through a line 119. With a low-rate spring, piston 115 will move valve member 112 so as to maintain the pressure drop across the metering valve substantially constant.

The value of the control is illustrated by FIGURE 2. The horizontal lines A represent pressure ratio substantially constant under normal afterburning operation. The value of pressure ratio varies with engine rotor speed. The greater the engine r.p.m. (determined by the position of the pilot's control lever 31) the higher is the scheduled pressure ratio.

The compressor is subject to surge above the surge line indicated in FIGURE 2. The position of the surge line is not constant, but varies with rotor speed in the diagram of FIGURE 2. In other words, occurrence of surge is a function of pressure ratio and corrected speed. Corrected speed is a function of actual rotor speed and inlet temperature.

Our control in response to the schedule established by control lever 31, which determines engine speed, and in response to engine inlet temperature, establishes the safe limit of pressure ratio. Since the surge line moves downward with decrease in r.p.m. the control overrides the normal fuel-air ratio control of afterburner fuel to skirt the surge line. Our pressure limiting control reduces fuel along one of the family of curves B of FIGURE 2, the particular curve being dependent upon speed.

It will be apparent that a device sensing actual rotor speed can be substituted for the connection 91 so that cam 90 is set by actual rotor sped rather than scheduled speed as illustrated. While more accurate, this is also more complicated in that it requires speed-responsive servomechanism.

To summarize, it will be apparent that the afterburner fuel is limited by the control to keep compressor pressure ratio below the surge line.

It will be apparent to those skilled in the art that other conditions which indicate the boundaries of the compressor surge region may be employed to actuate the afterburner fuel control to reduce afterburner fuel where necessary to avoid the surge region.

Our control makes it possible to operate the afterburner so as to obtain the maximum thrust augmentation short of surge. In other words, it provides for accurate skirting of surge-producing conditions.

The line of most efficient operation of a compressor ordinarily is very close to the surge line. The control may therefore assure most efficient operation of the compressor and therefore of the engine.

It will be apparent that the control of the invention may be embodied in various structures; hydraulic, pneumatic, electrical, or mechanical sensing elements and servomechanisms may be employed.

The description of the preferred embodiment of the invention, to illustrate the principles of the invention, is not to be considered as limiting the invention, as many modifications may be devised by the exercise of skill in the art within the scope of the invention.

We claim:

1. An afterburner fuel control system for a turbojet engine including a compressor, an afterburner, means for supplying fuel to the afterburner, and means regulating the rate of supply of said fuel; the control system comprising condition-responsive means normally coupled to and actuating the said regulating means and overriding control means coupled to the regulating means so as to be capable of overriding the condition-responsive means and actuating the regulating means in the sense to decrease afterburner fuel, the overriding control means comprising means establishing a schedule of compressor pressure ratio, means measuring compressor pressure ratio, and means responsive to excess of the said pressure ratio over the scheduled value unidirectionally connected to the said regulating means to decrease afterburner fuel in response to such excess.

2. An afterburner fuel control system for a turbojet engine including a compressor, an afterburner, means for supplying fuel to the afterburner, and means regulating the rate of supply of said fuel; the control system comprising condition-responsive means normally coupled to and actuating the said regulating means and overriding control means coupled to the regulating means so as to be capable of overriding the condition-responsive means and actuating the regulating means in the sense to decrease afterburner fuel, the overriding control means comprising means responsive to engine inlet air temperature establishing a schedule of compressor pressure ratio, means measuring compressor pressure ratio, and means responsive to excess of the said pressure ratio over the scheduled value unidirectionally connected to the said regulating means to decrease afterburner fuel in response to such excess.

3. An afterburner fuel control system for a turbojet engine including a compressor, an afterburner, means for supplying fuel to the afterburner, and means regulating the rate of supply of said fuel; the control system comprising condition-responsive means normally coupled to and actuating the said regulating means and overriding control means coupled to the regulating means so as to be capable of overriding the condition-responsive means and actuating the regulating means in the sense to decrease afterburner fuel, the overriding control means comprising an engine power control lever, means responsive to power control lever position establishing a schedule of compressor pressure ratio, means measuring compressor pressure ratio, and means responsive to excess of the said pressure ratio over the scheduled value unidirectionally connected to the said regulating means to decrease afterburner fuel in response to such excess.

4. An afterburner fuel control system for a turbojet engine including a compressor, an afterburner, means for supplying fuel to the afterburner, and means regulating the rate of supply of said fuel; the control system comprising condition-responsive means normally coupled to and actuating the said regulating means and overriding control means coupled to the regulating means so as to be capable of overriding the condition-responsive means and actuating the regulating means in the sense to decrease afterburner fuel, the overriding control means comprising an engine power control lever, means responsive to power control lever position and engine inlet air temperature establishing a schedule of compressor pressure ratio, means measuring compressor pressure ratio, and means responsive to exces of the said pressure ratio over the scheduled value unidirectionally connected to the said regulating means to decrease afterburner fuel in response to such excess.

5. An afterburner fuel control system for a turbojet engine including a compressor, an afterburner, means for supplying fuel to the afterburner, and means regulating the rate of supply of said fuel; the control system comprising an engine power control lever, means responsive to power control lever position and engine inlet air temperture establishing a schedule of compressor pressure ratio, means measuring compressor pressure ratio, and means responsive to excess of the said pressure ratio over the scheduled value connected to the said regulating means so as to decrease fuel flow in response to said excess.

References Cited in the file of this patent

UNITED STATES PATENTS

| | | |
|---|---|---|
| 2,713,767 | Alford | July 26, 1955 |
| 2,778,191 | Thompson | Jan. 22, 1957 |
| 2,805,543 | Lawry | Sept. 10, 1957 |
| 2,823,517 | Blanc | Feb. 18, 1958 |
| 2,906,093 | Robinson | Sept. 29, 1959 |
| 2,924,070 | Eastman | Feb. 9, 1960 |
| 2,933,887 | Daview | Apr. 26, 1960 |
| 2,955,416 | Hegg | Oct. 11, 1960 |

FOREIGN PATENTS

| | | |
|---|---|---|
| 745,146 | Great Britain | Feb. 22, 1956 |